US010035072B2

(12) United States Patent
Williams et al.

(10) Patent No.: US 10,035,072 B2
(45) Date of Patent: Jul. 31, 2018

(54) INTERACTIVE FOOD STORING DEVICE

(71) Applicants: Carmella Williams, Merrillville, IN (US); Sheldon Drake Williams, Merrillville, IN (US)

(72) Inventors: Carmella Williams, Merrillville, IN (US); Sheldon Drake Williams, Merrillville, IN (US)

( * ) Notice: Subject to any disclaimer, the term of this patent is extended or adjusted under 35 U.S.C. 154(b) by 0 days.

(21) Appl. No.: 15/335,791

(22) Filed: Oct. 27, 2016

(65) Prior Publication Data
US 2017/0216733 A1    Aug. 3, 2017

Related U.S. Application Data

(60) Provisional application No. 62/290,132, filed on Feb. 2, 2016.

(51) Int. Cl.
| | |
|---|---|
| B65D 73/00 | (2006.01) |
| A63H 3/00 | (2006.01) |
| A63H 3/28 | (2006.01) |
| H05B 37/02 | (2006.01) |
| B65D 81/36 | (2006.01) |
| B65D 43/02 | (2006.01) |
| B65D 85/34 | (2006.01) |

(52) U.S. Cl.
CPC ............... *A63H 3/005* (2013.01); *A63H 3/28* (2013.01); *H05B 37/0227* (2013.01); *A63H 2200/00* (2013.01); *B65D 43/0204* (2013.01); *B65D 43/0225* (2013.01); *B65D 81/365* (2013.01); *B65D 85/34* (2013.01); *B65D 2203/12* (2013.01)

(58) Field of Classification Search
CPC . A63H 3/005; A63H 3/28; A63H 3/36; B65D 81/365; B65D 85/34; B65D 2203/12
USPC ............. 206/457, 541, 459.5, 822; 446/304; 434/127
See application file for complete search history.

(56) References Cited

U.S. PATENT DOCUMENTS

| | | | |
|---|---|---|---|
| 5,314,336 A | 5/1994 | Diamond et al. | |
| 5,501,627 A | 3/1996 | Ekstein | |
| 2001/0031449 A1 | 10/2001 | Zwiers | |
| 2003/0233753 A1* | 12/2003 | Sala ..................... | A47G 19/025 30/142 |
| 2004/0055920 A1* | 3/2004 | Perez ................... | B65D 1/0223 206/457 |
| 2007/0128979 A1 | 6/2007 | Shackelford et al. | |
| 2008/0230424 A1* | 9/2008 | Chawla ................ | B65D 1/0223 206/459.5 |

(Continued)

*Primary Examiner* — Rafael Ortiz
(74) *Attorney, Agent, or Firm* — Global Intellectual Property Agency, LLC; Jordan Sworen

(57) ABSTRACT

An interactive food storing device. The food storing device includes a container having a base, one or more sidewalls, and an open end, defining an interior volume for storing food. A body extends from the base of the container for supporting the container in an upright position. A sensor is disposed in the container in order to detect movement within the interior volume of the container. The device includes a speaker and an audio unit connected to a processor for playing pre-recorded messages when the sensor detects an object. Further, portions of the device illuminate when food is placed within the container. The container and body resemble a fruit or vegetable in order to encourage children to eat healthy foods.

9 Claims, 2 Drawing Sheets

(56) References Cited

U.S. PATENT DOCUMENTS

2014/0284238 A1\* 9/2014 Clinton ................. B65D 85/60
                      206/457
2015/0174499 A1\* 6/2015 Rosenheck ............ A63H 3/005
                      434/118

\* cited by examiner

INTERACTIVE FOOD STORING DEVICE

CROSS REFERENCE TO RELATED APPLICATION

This application claims the benefit of U.S. Provisional Application No. 62/290,132 filed on Feb. 2, 2016. The above identified patent application is herein incorporated by reference in its entirety to provide continuity of disclosure.

BACKGROUND OF THE INVENTION

The present invention relates to food storing devices. More specifically, the present invention provides an interactive food storage device resembling a fruit or vegetable comprising a container for storing healthy foods therein, wherein the device is configured to interact with a child via lights and pre-recorded messages.

Many children do not eat the recommended daily intake of fruits and vegetables because they dislike the taste or are not encouraged to eat fruits or vegetables. A diet lacking in fruits and vegetables can lead to malnutrition or other medical issues. Further, it can be difficult to convince a child to eat fruits and vegetables because children often do not understand the necessity of eating healthy foods. Therefore, there exists a need for a device that encourages children to eat fruits and vegetables.

Devices have been disclosed in the known art that relate to food storing devices. These include devices that have been patented and published in patent application publications. These devices generally relate to interactive toys. These prior art devices have several known drawbacks. These devices, however, fail to provide an interactive food storing device resembling a fruit or vegetable having an interior volume for storing food therein.

In light of the devices disclosed in the known art, it is submitted that the present invention substantially diverges in design elements from the known art and consequently it is clear that there is a need in the art for an improvement to existing food storing devices. In this regard the instant invention substantially fulfills these needs.

SUMMARY OF THE INVENTION

In view of the foregoing disadvantages inherent in the known types of food storing devices now present in the prior art, the present invention provides a new interactive food storing device wherein the same can be utilized for providing convenience for the user when encouraging children to eat healthy foods by producing lights and pre-recorded messages when a container is filled with healthy foods.

It is therefore an object of the present invention to provide a new and improved interactive food storing device that has all of the advantages of the prior art and none of the disadvantages. The food storing device comprises a container having a base, one or more sidewalls, and an open end, defining an interior volume for storing food. A body extends from the base of the container for supporting the container in an upright position. A sensor is disposed in the container in order to detect movement within the interior volume of the container. The device includes a speaker and an audio unit connected to a processor for playing pre-recorded messages when the sensor detects an object. Further, portions of the device illuminate when food is placed within the container.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
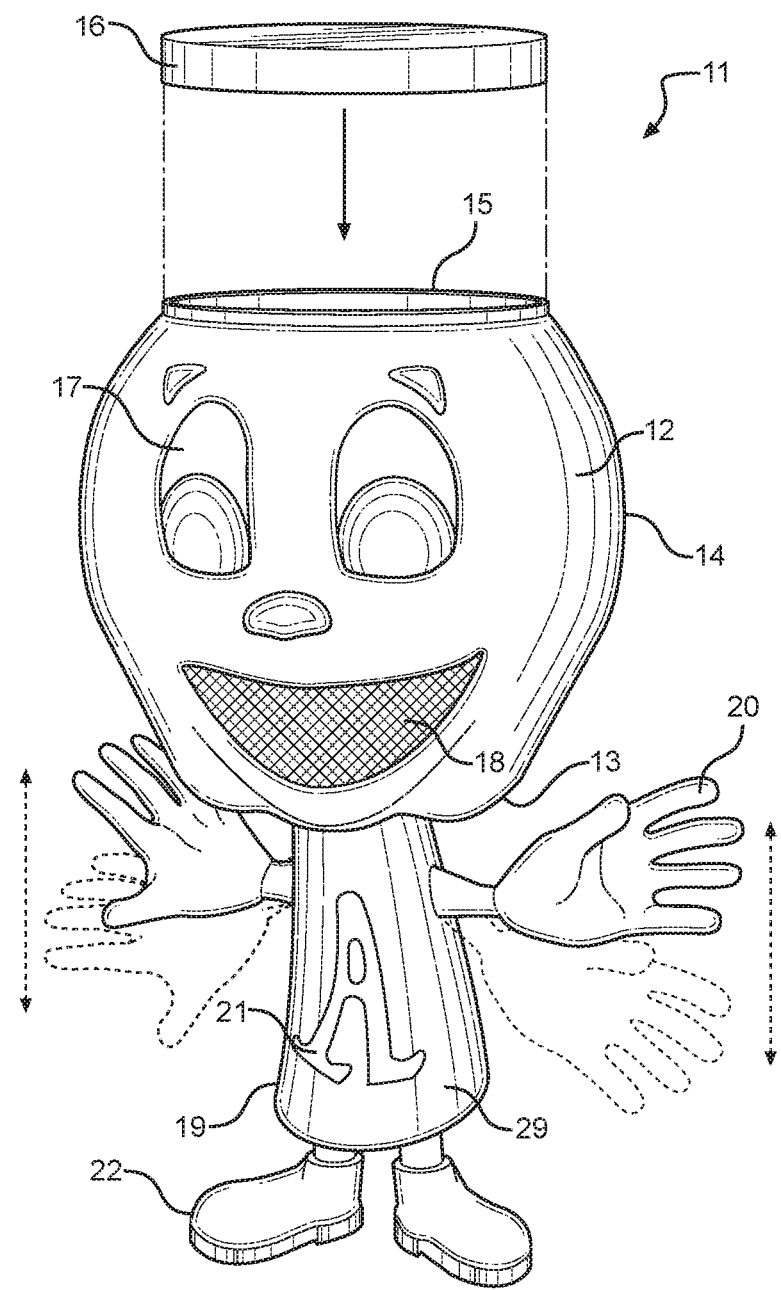
FIG. 1 shows a perspective view of an embodiment of the interactive food storing device.

Reference is made herein to the attached drawings. Like reference numerals are used throughout the drawings to depict like or similar elements of the interactive food storing device. For the purposes of presenting a brief and clear description of the present invention, the preferred embodiment will be discussed as used for encouraging children to eat healthy foods by producing lights and pre-recorded messages when a container is filled with healthy foods. The figures are intended for representative purposes only and should not be considered to be limiting in any respect.

Referring now to FIG. 1, there is shown a perspective view of an embodiment of the interactive food storing device. The device 11 comprises a container 12 having a base 13, one or more sidewalk 14, and an open end 15, defining an interior volume. In the illustrated embodiment, the container 12 is shaped as an apple. However, in alternate embodiments, the container 12 is shaped to resemble a fruit or vegetable so as to indicate to a user what type of food to insert into the container 12.

In the illustrated embodiment, a lid 16 removably covers the open upper end 15 of the container 12. The lid 16 is shaped so as to cover the entire open end 15. In the illustrated embodiment, the lid 16 is secured to the container 15 via a snap fit. However, in alternate embodiments, the lid 16 is secured to the container 15 by any suitable fastener, such as threading.

A body 19 extends from the base 13 of the container 13 so as to support the container 12 in an upright configuration. In the illustrated embodiment, a pair of legs 22 having feet extend from a distal end of the body 19. In some embodiments, the legs 22 are movable so as to allow the user to adjust the stance of the interactive food storing device 11. A pair of arms 20 having hands extend from each lateral side of the body 19. In the illustrated embodiment, the arms 20 are movable along a vertical axis. In other embodiments, the arms 20 are configured to rotate and move along a horizontal axis so as to clap. The arms 20 are configured to move manually or automatically. The arms 20 move automatically interior volume of the container is filled with food. The movement is adapted to excite and encourage user's to eat the food within the container 12 and then refill the container 12 with the food. In one exemplary use, the arms 20 are manipulated by a user to rotate towards each other so as to clap.

In the illustrated embodiment, an indicia 21 is provided on a front side 29 of the body so as to further indicate to a user the shape of the container 12 and what types of food is to be placed within the container 12. For example, in the illustrated embodiment, the indicia 21 comprises the letter "A" for apple in order to indicate the shape of the container as an apple. In alternate embodiments, the word 'apple' is disposed on the front side 29 of the container 12.

Figure 2:
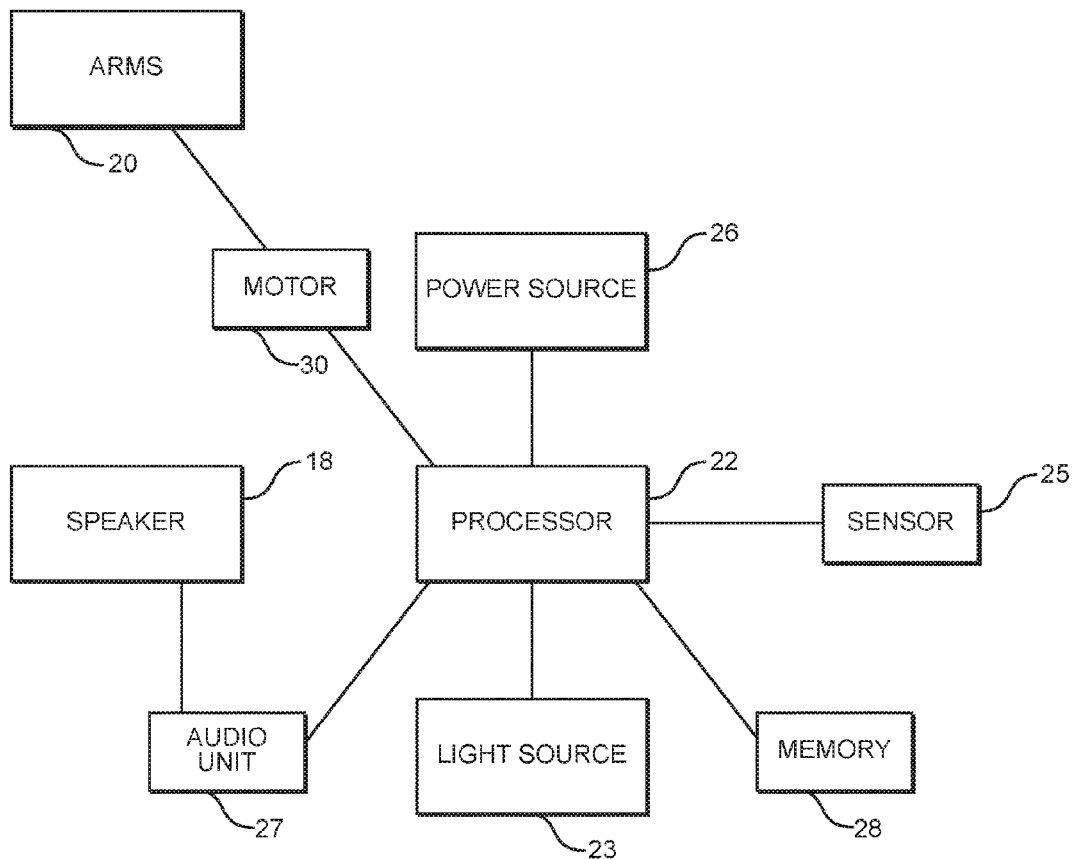
FIG. 2 shows a block diagram of a control circuit of the interactive food storing device.

Referring now to FIG. 2, there is shown a block diagram of a control circuit of the interactive food storing device. The interactive food storing device includes a control circuit comprising a sensor 25 disposed at the upper end of the container. The sensor 25 is configured to detect when an object, such as food, is disposed within the interior volume of the container at the position of the sensor 25 and then transmit a signal to a processor 22. The processor 22 is disposed within the interactive food storing device and adapted to give commands to the operating components disposed on the control circuit. In the illustrated embodiment, the sensor 25 is a motion sensor. However, in alternate embodiments, any suitable sensor can be used such as an optical sensor.

The control circuit further comprises a memory 28 operably connected to the processor 22, wherein the memory 28 comprises pre-recorded messages. The pre-recorded messages are adapted to encourage a user to continue to eat the food within the container. In operation, the sensor 25 detects that the user has filled the container with a healthy food or has reached into the container to remove a healthy food and the pre-recorded message is played through a speaker 18. For example, the pre-recorded messages stored on the memory 28 are "full," "fruit is yummy!" and "vegetables are good for you!"

The speaker 18, operably connected to an audio unit 27, is disposed on a sidewall of the container. In the illustrated embodiment shown in FIG. 1, the speaker 18 comprises a crescent shape so as to resemble a mouth. The audio unit 27 is further operably connected to the processor 22 and configured to produce audible output through the speaker 18 in response to the sensor 25 detecting movement. In the illustrated embodiment, the audio output is the pre-recorded message stored within the memory 28.

A pair of translucent sections 17 (shown in FIG. 1) resembling a pair of eyes are disposed on the same sidewall of the container as the speaker 18, so as to resemble a face. Each of the pair of translucent sections 17 comprise a light source 23, such as an LED, disposed on an interior side thereof. The light source 23 is operably connected to the processor 22 and configured to automatically illuminate when the sensor 25 detects movement. Further, the arms 20 are operably connected to a motor 30 in order to move the arms 20 along the vertical axis. The motor 30 is operably connected to the processor 22, wherein the processor 22 commands the motor 30 to move the arms 30 when the sensor 25 detects movement. All the components disposed along the control circuit are operated by a power source 26, such as a battery contained within the body of the interactive food storing device. In some embodiments, a power switch is disposed on the exterior of the device and operably connected to the control circuit such that a user can selectively turn the sensor 25 on and off.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An interactive food storing device, comprising:
   a container having a base, one or more sidewalls, and an open end, defining an interior volume, wherein the container is a fruit shape or a vegetable shape; a fruit or a vegetable contained within the container;
   a body extending from the base of the container;
   a sensor disposed at an upper end of the container configured to detect movement within the interior volume of the container;
   a processor disposed within the interactive food storing device and operably connected to the sensor;
   a speaker disposed on the one or more sidewalls of the container, wherein the speaker comprises a crescent shape;
   an audio unit operably connected to the processor and configured to produce audible output through the speaker in response to the sensor detecting movement;
   a memory storing pre-recorded messages operably connected to the processor and configured to direct a user to eat the fruit or the vegetable upon detecting movement within the interior volume by the sensor.

2. The interactive food storing device of claim 1, further comprising a pair of translucent sections resembling a pair of eyes disposed on the one or more sidewalls of the container, wherein each of the pair of translucent sections comprise a light source disposed on an interior side thereof.

3. The interactive food storing device of claim 2, wherein the light source is configured to illuminate when the sensor detects movement.

4. The interactive food storing device of claim 1, wherein a distal end of the body comprises a pair of legs extending therefrom and configured to support the body and the container in an upright position.

5. The interactive food storing device of claim 1, further comprising a pair of arms each extending from an opposing lateral side of the body, wherein the pair of arms move automatically along a vertical axis and along a horizontal axis when the sensor detects movement within the interior volume.

6. The interactive food storing device of claim 1, further comprising indicia on a front side of the body in order to indicate to a user the entire shape of the container.

7. The interactive food storing device of claim 6, wherein the indicia is a letter A and the entire shape of the container is an apple.

8. The interactive food storing device of claim 1, further comprising a lid removably covering the open end of the container.

9. The interactive food storing device of claim 1, wherein the body comprises a pair of legs and a pair of arms extending directly therefrom.

\* \* \* \* \*